United States Patent [19]

Hayama

[11] Patent Number: 4,709,595

[45] Date of Patent: Dec. 1, 1987

[54] CRUISE CONTROL SYSTEM FOR VEHICLE

[75] Inventor: Mamoru Hayama, Hiroshima, Japan

[73] Assignee: Mazda Motor Corporation, Japan

[21] Appl. No.: 942,752

[22] Filed: Dec. 17, 1986

[30] Foreign Application Priority Data

Dec. 19, 1985 [JP] Japan .................................. 60/286349

[51] Int. Cl.$^4$ .............................................. B60K 41/04
[52] U.S. Cl. ....................................... 74/864; 180/177;
180/176; 123/378; 74/858
[58] Field of Search .................. 74/858, 863, 864, 872,
74/878; 180/176, 177; 123/378

[56] References Cited

U.S. PATENT DOCUMENTS

| 3,712,156 | 1/1973 | Kuhnle ...................................... 74/858 |
| 3,768,339 | 10/1973 | Kolehmainen et al. .............. 74/864 |
| 4,520,694 | 6/1985 | Eschrich et al. ................... 74/866 X |
| 4,535,864 | 8/1985 | Tanigawa et al. ................... 180/177 |
| 4,535,865 | 8/1985 | Tanigawa et al. ................... 180/177 |

FOREIGN PATENT DOCUMENTS 57-164228 10/1982 Japan .

Primary Examiner—Leslie Braun
Assistant Examiner—Dirk Wright
Attorney, Agent, or Firm—Gerald J. Ferguson, Jr.;
Michael P. Hoffman; Michael J. Foycik, Jr.

[57] ABSTRACT

A cruise control system for a vehicle having an automatic transmission comprises a vehicle speed sensor for detecting the actual vehicle speed, an engine output power control mechanism, and a vehicle speed controller which compares the actual vehicle speed detected by the vehicle speed sensor with a set speed and controls the engine output power control mechanism in accordance with the result of the comparison so that the vehicle speed is converged upon the set speed at a predetermined rate. The automatic transmission is caused to downshift when the actual vehicle speed is lowered from the set speed by a predetermined amount while the vehicle speed controller operates to fix the vehicle speed, and when the automatic transmission is shifted down, the predetermined rate of convergence is reduced so that the vehicle speed is converged upon the set speed at a reduced rate.

10 Claims, 7 Drawing Figures

F I G.1
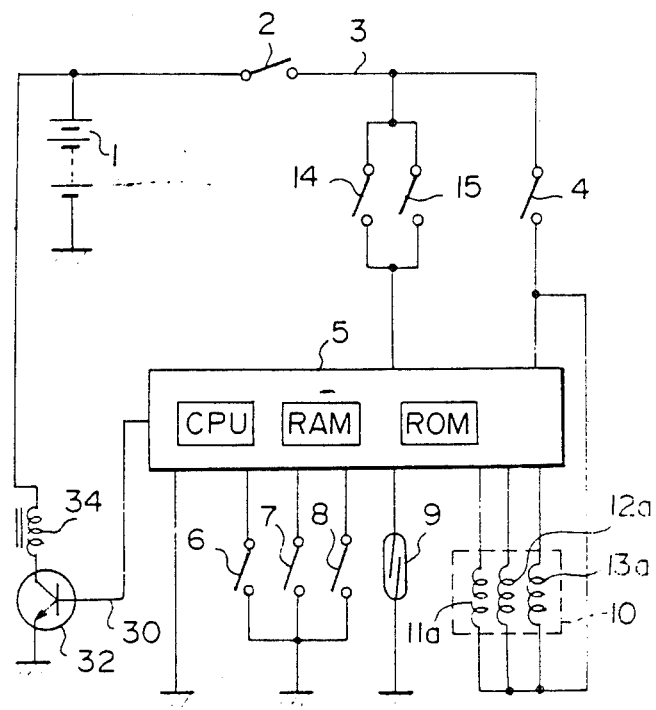

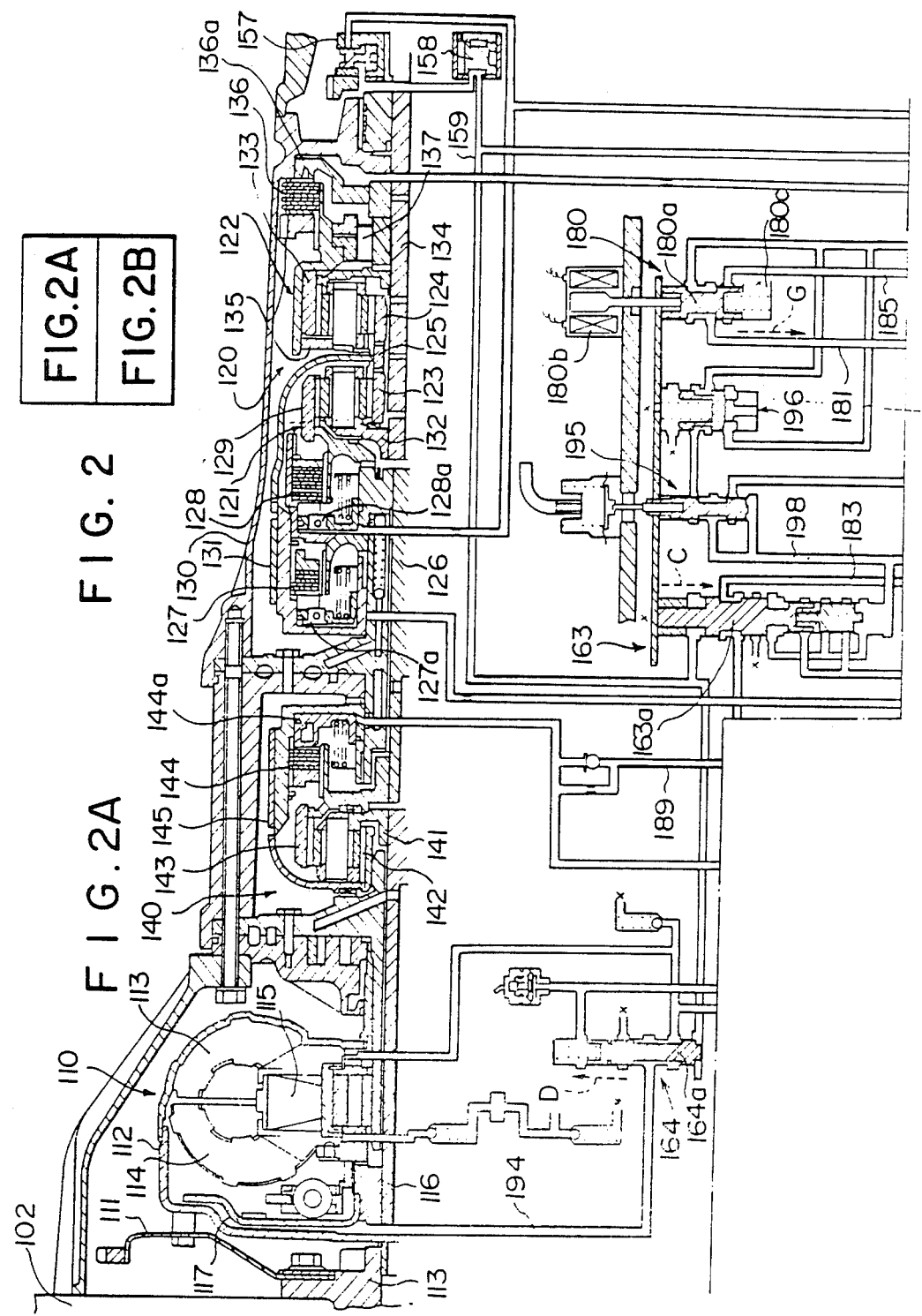

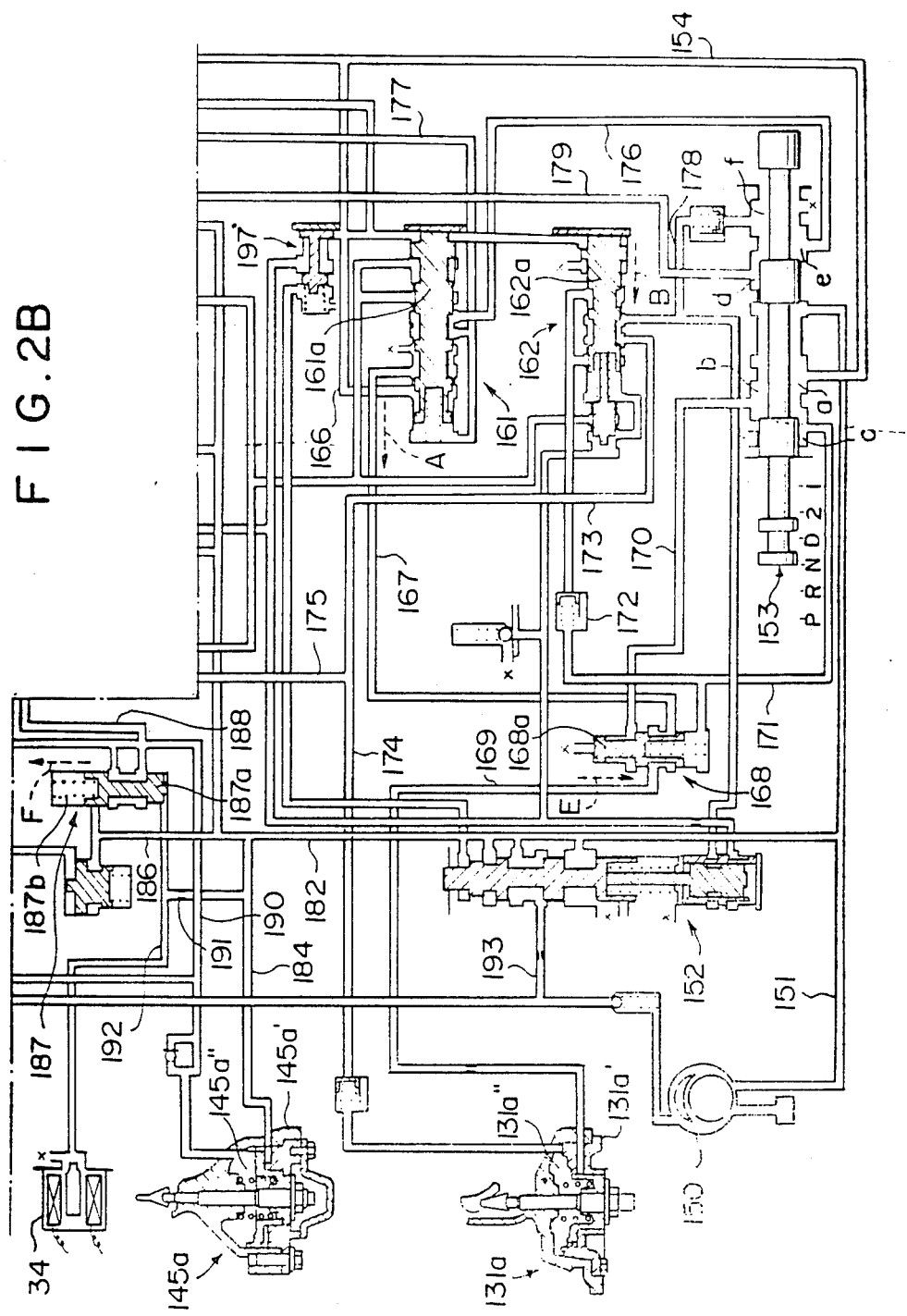

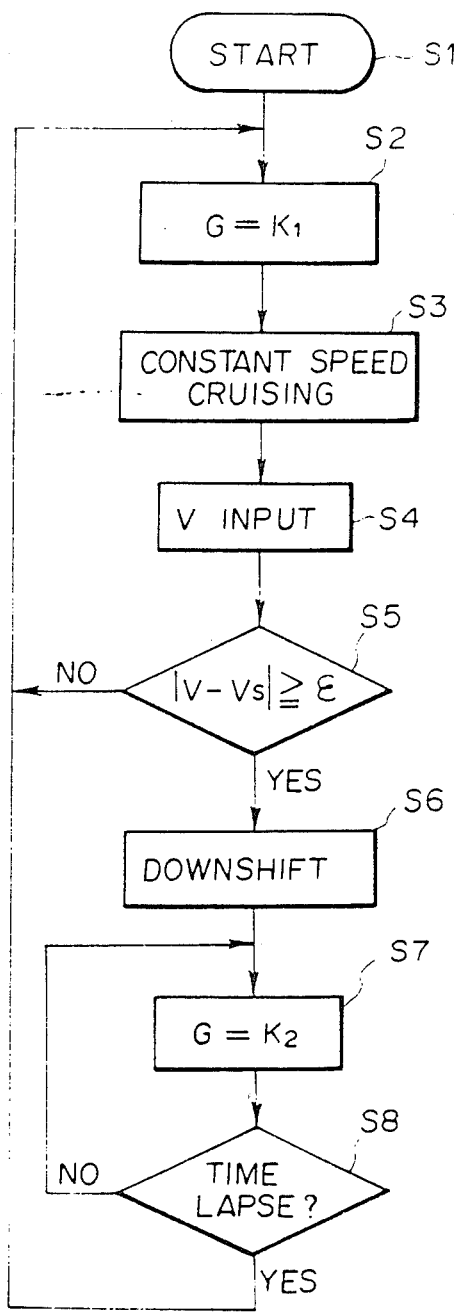

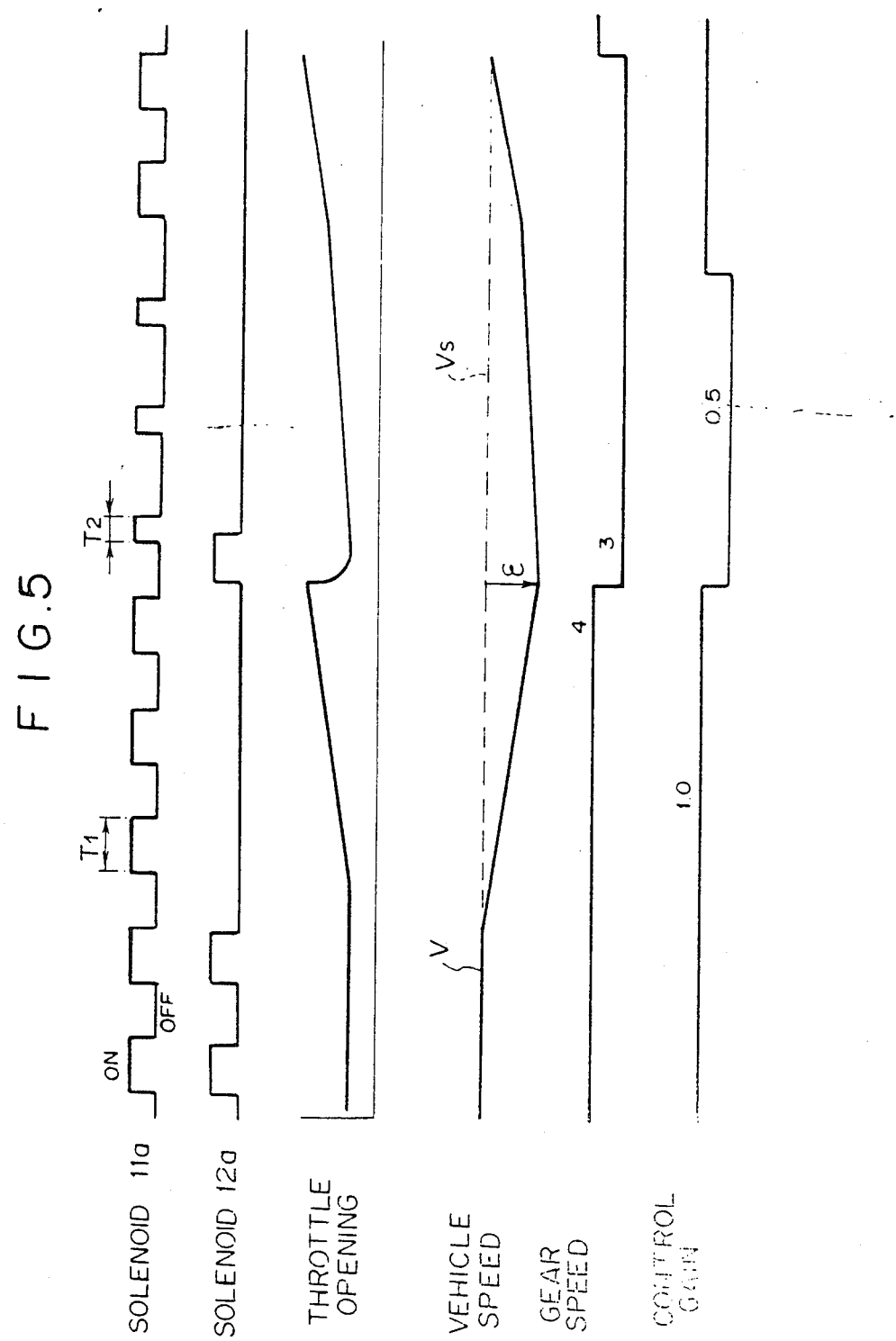

CRUISE CONTROL SYSTEM FOR VEHICLE

BACKGROUND OF THE INVENTION

1. Field of the Invention

This invention relates to a cruise control system for a vehicle which automatically maintains a desired vehicle speed, and more particularly to such a cruise control system for an automatic transmission vehicle.

2. Description of the Prior Art

Recently, there has been put into practice a cruise control system which automatically keeps the vehicle speed at a desired speed set by the driver. In the control system, when the vehicle speed reaches a desired speed, the driver operates a setting means, and thereafter the throttle valve of the engine is automatically controlled according to the difference between the desired speed and the actual vehicle speed to maintain the desired speed. An example of such a cruise control system is disclosed in Japanese Unexamined Utility Model Publication No. 57(1982)-164228.

In such a cruise control system, when the required driving force is increased, for example, as the vehicle ascends a slope during constant speed cruising, the throttle opening is generally increased to increase the amount of fuel to be fed to the engine in order to prevent deceleration. However, when the slope is too steep for the desired speed to be maintained by increasing the amount of fuel to be fed to the engine, the transmission is automatically shifted down.

When the transmission is shifted down, the driving force transmitted to the wheels is increased and the vehicle speed can be increased to the desired speed. However, the downshift of the transmission abruptly increases the driving force transmitted to the wheels and possibly involves the following problems. First, a shock can be generated by the abrupt increase of the vehicle speed to the desired speed by the increased driving force. Second, if downshift is effected during cornering, the increased driving force can increase the vehicle speed abruptly, thereby increasing the centrifugal force acting on the vehicle body, forcing the vehicle outwardly. This adversely affects driving safety.

SUMMARY OF THE INVENTION

In view of the foregoing observations and description, the primary object of the present invention is to provide a cruise control system in which the problems inherent in the conventional cruise control systems can be avoided by controlling the vehicle speed to gradually increase when downshift is effected during constant speed cruising.

In accordance with the present invention, there is provided a cruise control system for a vehicle having an automatic transmission comprising a vehicle speed detecting means for detecting the actual vehicle speed, an engine output power control means, a vehicle speed control means which compares the actual vehicle speed detected by the vehicle speed detecting means with a set speed and controls the engine output power control means in accordance with the result of the comparison so that the vehicle speed is substantially fixed to the set speed, a downshift means which causes the automatic transmission to downshift when the actual vehicle speed is lowered from the set speed by a predetermined amount while the vehicle speed control means operates to fix the vehicle speed, and a control gain reducing means which, when the automatic transmission is shifted down by the downshift means, reduces the gain of the control made by the vehicle speed control means on the engine output power control means.

BRIEF DESCRIPTION OF THE DRAWINGS

FIG. 1 is a schematic circuit diagram of a cruise control system in accordance with an embodiment of the present invention, FIG. 2, which is divided into FIGS. 2A and 2B, is a view illustrating the automatic transmission employed in the embodiment of FIG. 1, FIG. 4 is a flow chart illustrating the operation of the controller employed in the embodiment of FIG. 1, and FIG. 5 is a view for illustrating the features of operation of the cruise control system of the embodiment of FIG. 1.

DESCRIPTION OF THE PREFERRED EMBODIMENT

Figure 3:
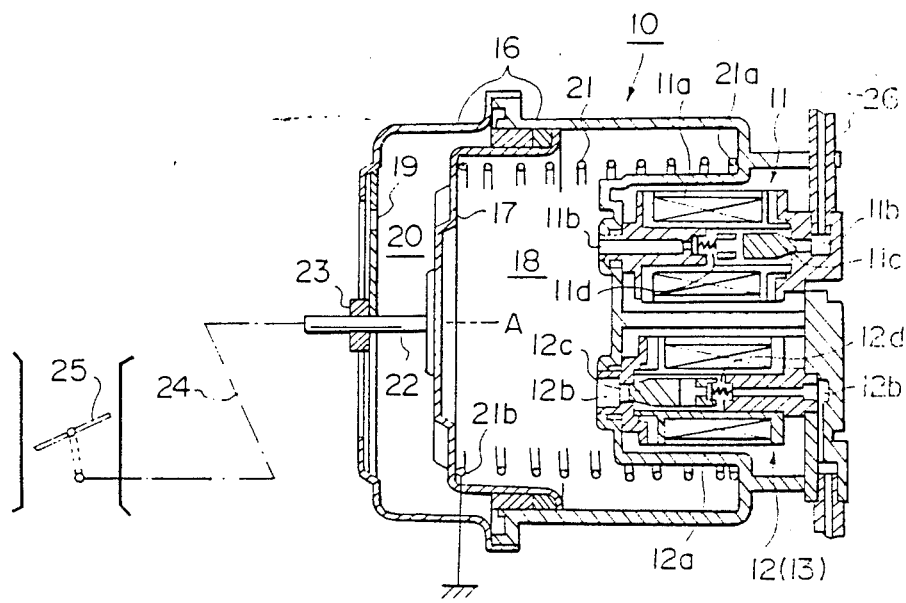
FIG. 3 is a view illustrating an example of the actuator which can be employed in the cruise control system of the embodiment of FIG. 1.

In FIG. 1, a cruise control system for a vehicle having an automatic transmission in accordance with an embodiment of the present invention comprises a controller 5 connected by way of a main switch 4 to a power circuit 3, which connected to a power source 1 by way of an ignition switch 2. Signals from an acceleration switch 6, a coast switch 7, a resume switch 8 and a vehicle speed sensor 9 are input into the controller 5 and signals are output to solenoids 11a, 12a and 13a of an actuator 10 from the controller 5. The controller 5 comprises a microcomputer and includes a central processing unit (CPU), a read only memory (ROM) and a random access memory (RAM).

The acceleration switch 6, coast switch 7 and resume switch 8 are connected in parallel between the controller 5 and ground. The acceleration switch 6 functions as both a vehicle speed set switch and an increase set switch as described above. That is, when the acceleration switch 6 is turned on and then immediately turned off while the vehicle speed is between 40 Km/h and 100 Km/h, the vehicle speed is set to or fixed at what the speed was when the acceleration switch 6 was operated. On the other hand, when the acceleration switch 6 is kept on, the vehicle speed is continuously increased until the switch 6 is turned off and the vehicle speed is fixed at what the speed was at the moment the switch 6 was turned off. The coast switch 7 is for decreasing the set speed. When the coast switch 7 is turned on during the constant speed cruising, the speed is reduced until the coast switch 7 is turned off. The resume switch 8 is turned on to return the vehicle speed to the set speed in the case that the constant speed cruising is released by an operation other than the turning-off of the main switch 4. On the basis of the signals from the switches 6, 7 and 8 and the signals from the vehicle speed sensor 9, the controller 5 delivers to the solenoids 11a, 12a and 13a of the actuator 10 a signal which maintains the set vehicle speed, increases the vehicle speed, decreases the vehicle speed or returns the vehicle speed to the set speed.

Further, a selector lever position switch 14 and a brake switch 15 are connected in parallel between the controller 5 and the power circuit 3. The selector lever position switch 14 is turned on when the selector lever of the automatic transmission is put in N (neutral), R (reverse) or P (parking), and the brake switch 15 is turned on when the brake pedal is operated. When at least one of the switches 14 and 15 is turned on, a constant speed releasing signal is delivered to the controller 5 to interrupt the constant speed cruising.

An output line 30 of the controller 5 is connected to the base of a transistor 32. The collector of the transistor 32 is connected to a downshifting solenoid 34 which will be described in detail later and the emitter of the same is grounded. The downshifting solenoid 34 is further connected to the power source 1 so that when an on-signal is input into the transistor 32 from the controller 5 through the output line 30, the downshifting solenoid 34 is energized. The downshifting solenoid 34 actuates a hydraulic control valve of the automatic transmission (which is described in detail with reference to FIG. 2) to downshift the transmission by one speed, for example, from fourth to third when energized.

In FIG. 2, the automatic transmission comprises a hydraulic torque converter 110, a multiple stage transmission gear mechanism 120, and a planetary gear type over-drive transmission mechanism 140 arranged between the torque converter 110 and the multiple stage transmission gear mechanism 120.

The torque converter 110 has a pump 113 connected to an output shaft 103 of an engine 102 through a drive plate 111 and a converter casing 112, a turbine 114 provided in the casing 112 facing the pump 113 and a stator 115 disposed between the pump 113 and the turbine 114. A converter output shaft 116 is connected to the turbine 114. A lock-up clutch 117 is provided between the converter output shaft 116 and the casing 112 which is connected to the pump 113. The lock-up clutch 117 is normally engaged with the casing 112 under the pressure of a hydraulic fluid which circulates in the torque converter 110, and is released by drawing the hydraulic pressure to a space between the casing 112 and the clutch 117 by an external pressure source.

The multiple stage transmission gear mechanism 120 has a front planetary gear unit 121 and a rear planetary gear unit 122. The front planetary gear unit 121 has a sun gear 123 connected with a sun gear 124 of the rear planetary gear unit 122 by way of a connecting rod 125. The gear mechanism 120 has an input shaft 126 connected through a front clutch 127 with the connecting rod 125 and through a rear clutch 128 with an internal gear 129 of the front planetary gear unit 121. A front brake 131 is provided between the connecting rod 125 or the sun gears 123 and 124 of the gear units 121 and 122, and a casing 130 of the transmission. The gear mechanism 120 also has an output shaft 134 connected with a planetary carrier 132 of the front planetary gear unit 121 and an internal gear 133 of the rear planetary gear unit 122. The rear planetary gear unit 122 has a planetary carrier 135, and there are provided between the planetary carrier 135 and the transmission casing 130 a rear brake 136 and a one-way clutch 137.

The planetary gear type over-drive transmission mechanism 140 includes planetary gears 141a, a planetary carrier 141 rotatably carrying the planetary gears 141a and connected with the output shaft 116 of the torque converter 110, a sun gear 142 engaged with the planetary gears 141a, and an internal gear 143 which is also engaged with the planetary gears 141a and connected with the sun gear 142 through a direct connection clutch 144. An over-drive brake 145 is provided between the sun gear 142 and the transmission casing 130. The internal gear 143 is connected with the input shaft 126 of the multiple stage transmission gear mechanism 120.

The multiple stage transmission gear mechanism 120 is of a known type and can provide three forward speeds and one reverse. The planetary gear type over-drive transmission mechanism 140 connects the shafts 116 and 126 directly when the direct connection clutch 144 is engaged and the brake 145 is released, and provides an over-drive connection between the shafts 116 and 126 when the brake 145 is engaged and the clutch 144 is released.

As shown in FIG. 2, the automatic transmission is provided with a hydraulic control circuit. The hydraulic control circuit has an oil pump 150 which is driven by the engine output shaft 103 through the torque converter 110. Hydraulic oil is discharged under pressure from the pump 150 into a pressure line 151. The oil pressure is reduced by a pressure regulating valve 152 and applied to a select valve 153. The select valve 153 has a plunger which can be selectively positioned in one of shift positions 1, 2, D, N, R and P. When the select valve 153 is positioned in the position D, the pressure line 151 is communicated with the ports a, b and c of the select valve 153. In the position 2, the pressure line 151 is communicated with the ports a, b and d of the select valve 153 whereas in the position 1, the line is communicated with the ports a, d and e. In the position R, the line 151 is communicated with the ports d, e and f. The port a is communicated through a line 154 with a hydraulic actuator 128a for the rear clutch 128. It will be understood that when the select valve 103 is positioned in any one of the positions D, 2 and 1, the actuator 128a causes the rear clutch 128 to engage.

The line 154 from the port a is connected with a second governor valve 157 which is provided on the output shaft 134 of the transmission gear mechanism 120. The second governor valve 157 has an output port connected with a first governor valve 158 which is also provided on the output shaft 134. The first governor valve 158 has an output port connected with a governor pressure line 159. The governor valves 157 and 158 produce a governor pressure which is substantially proportional to the rotational speed of the output shaft 134. The governor pressure line 159 is connected with a 1-2 shift valve 161, a 2-3 shift valve 162, a 3-4 shift valve 63 and a lock-up valve 164 to apply the governor pressure to these valves so that spools 161a, 162a, 163a and 164a of these valves are forced respectively in the directions shown by arrows A, B, C and D.

The port a is also communicated through a line 166 branched from the line 154 with the 1-2 shift valve at a port which is communicated with a line 167 when the spool 161a is shifted in the direction of the arrow A under the governor pressure introduced at the right hand end of the spool 161a. The line 167 leads to a second lock valve 168 having a spool 168a which is urged upward by a spring. With the select valve 153 in the position D, hydraulic pressure is applied from the ports b and c through lines 170 and 171 respectively to the second lock valve 168 and the hydraulic pressure functions to keep the spool 68a in the position shown in FIG. 2. In this position of the spool 168a, the line 167 is communicated with a line 169 leading to an engaging port 131a' of an actuator 131 for the front brake 131. It will be understood that when the spool 161a of the 1-2 shift valve 162 is moved in the direction of the arrow A, hydraulic pressure is led to the engaging port 131a' of the actuator 131a to cause the front brake 131 to engage.

The line 171 from the port c of the select valve 153 is connected through an orifice check valve 172 with the 2-3 shift valve 162 at a port which is communicated with a line 173 when the spool 162a is moved in the direction of the arrow B under the governor pressure applied to the right hand end of the spool 162a. The line 173 is branched into lines 174 and 175, the line 174 being connected to a release port 131a" of the actuator 131a for the front brake 131 and the line 175 to an actuator 127a for the front clutch 127. It will be understood that the front brake 131 is released and the front clutch 127 is engaged when the spool 162a of the 2-3 shift valve 162 is moved to the left position under the governor pressure.

The port c of the select valve 153 is disconnected from the pressure line 151 when the select valve 153 is in the position 2. Since the port b is still in communication with the pressure line 151, the spool 168a of the second lock valve 168 is moved in the direction of arrow E to thereby connect the line 169 with the line 170. Thus, hydraulic pressure is introduced through the lines 170 and 169 to the engaging port 131a' of the actuator 131a to cause the front brake 131 to engage irrespective of the position of the spool 161a of the 1-2 shift valve 161.

The port e is connected with the pressure line 151 when the select valve 153 is in either one of the positions 1 and R. The port e is connected through a line 176 to the 1-2 shift valve 161 at a port which is communicated with a line 177 when the spool 161a is in the right position as shown in FIG. 2. Thus, in this position of the spool 161a, the rear brake 136 is engaged under a hydraulic pressure applied through the line 177 to an actuator 136a.

The select valve 153 further has a port f which is communicated with the pressure line 151 when the select valve 153 is in the position R. The port f is connected through a line 178 with the 2-3 shift valve 162 at a port which is communicated with the line 173 when the spool 162a is in the position at the right shown in FIG. 2. Thus, hydraulic pressure is applied in the position R to the actuator 127a to engage the front clutch 127. The hydraulic pressure is also applied to the release port 131a" of the actuator 131a, though the pressure does not cause any change in the actuator 131a because it is in the release position since it is not supplied with hydraulic pressure at the engaging port 131a' in the position R of the select valve 153.

The port d which is in communication with the pressure line 151 in any one of the positions 2, 1 and R is connected with a line 179 leading to a kick-down valve 180. The valve 180 has a spool 180a which is urged upward by a spring 180c and actuated by a kick-down solenoid 180b. In the upward position of the spool 180a, the valve 180 connects the line 170 with a line 181 which leads to the 1-2 shift valve 161, the 2-3 shift valve 162 and the 3-4 shift valve 163. When the hydraulic pressure is applied from the line 181, spools 161a, 162a and 163a of the respective valves 161, 162 and 163 are held in the positions shown in FIG. 2.

The pressure line 151 is further connected with a branch line 182 which leads through lines 183, 184, 185 and 186 respectively to the 3-4 shift valve 163, an engaging port 145a' of an actuator 145a for the overdrive brake 145, the kick-down valve 180 and an overdrive release valve 187. The line 183 leading to the 3-4 shift valve 163 is communicated through a line 188 with the overdrive release valve 187 when the spool 163a of the shift valve 163 is in the position shown in FIG. 2. The line 188 is communicated, when the spool 187a of the valve 187 is in the position shown in FIG. 2, through lines 89 and 90 respectively with an actuator 144a for the direct drive clutch 144 and a release port 145a" of the actuator 145a for the overdrive brake 145. It will be understood that, in the positions of the valves shown in FIG. 2, the direct drive clutch 144 is engaged and the overdrive brake 145 is released. When the spool 63a of the 3-4 shift valve 163 is moved in the direction of the arrow C under the governor pressure, the line 183 is disconnected from the line 188 and the line 188 is opened to the drain port. Therefore, the pressure is released from the actuator 144a and the release port 145a" of the actuator 145a so that the direct drive clutch 144 is released and the overdrive brake 145 is engaged.

The line 186 leading to the overdrive release valve 187 is normally closed by the spool 187a of the valve 187 as shown in FIG. 2. When the spool 187a is moved in the direction of arrow F, the line 186 is communicated with the lines 89 and 90 to thereby engage the direct drive clutch 144 and release the overdrive brake 145. In order to effect the aforementioned movement of the spool 187a, the line 184 is connected with the lower end portion of the spool 187a through a line 192 which has an orifice 191. Said downshifting solenoid 34 is a normally open solenoid and is provided in a drain port 192a of the line 192. It will be understood that the line 192 is normally opened to the drain port 192a so that the spool 187a of the valve 187 is held in the position shown in FIG. 2 under the influence of a spring 187b. When the downshifting solenoid 34 is energized to close the drain port 192a, a pressure is built up in the line 192 so that the spool 187a is shifted in the direction of the arrow F.

The line 185 leading to the kick-down valve 180 is normally closed by the spool 180a of the valve 180. The spool 180a of the kick-down valve 180 is shifted in the direction of arrow G when the solenoid 180b is energized, and in the shifted position of the spool 180a, the line 185 is connected with the line 181. As described above, the line 181 is in communication with the line 179 from the port d of the select valve 153 when the solenoid 180b is de-energized. The port d is opened to the drain port when the select valve 153 is in the position D so that no pressure is built up in the line 181 in this instance. When the solenoid valve 180b is energized, however, the pressure is supplied from the line 185 to the line 181 and the pressure functions to hold the spools 161a, 162a and 163a of the shift valves 161, 162 and 163 in the positions shown in FIG. 2 when the spools are in the illustrated positions. When any one or all of the spools 161a, 162a and 163a are in the positions shifted in the directions of the arrows A, B and C, the pressure in the line 181 counteracts the governor pressure applied to the spools and moves the spools to the illustrated positions when the pressure in the line 181 overcomes the governor pressure.

The pressure regulating valve 152 has a port which is connected to a line 193 leading to the lock-up valve 164 having a spool 164a. With the spool 164a in the position shown in FIG. 2, the line 193 is connected with a line 194 to supply a hydraulic pressure to the torque converter 110 to thereby force the lock-up clutch 117 toward the released position. As described above, the governor pressure is applied through the line 159 to the lower end of the spool 164a. Further, the pressure in the line 190 is applied to the upper end of the spool 164a. It will be understood that as the governor pressure increases beyond a predetermined value, it overcomes the force applied by the pressure in the line 190 and causes the spool 164a to move in the direction of the arrow D. Thus, the line 194 is disconnected from the line 193 and opened to the drain port to thereby cause the lock-up clutch 117 to engage. The hydraulic system further includes a vacuum 195 for producing a throttle pressure corresponding to the opening of the throttle valve of the engine. Further, there is provided a throttle back-up valve 196 for supplementing the vacuum throttle valve 195 and a pressure modifier valve 197 for modifying the output pressure of the valve 152. The throttle pressure from the valve 195 is led through a line 198 to the 2-3 shift valve 162 and the 3-4 shift valve 163 to force the spools 162a and 163a in the valves 162 and 163 in the directions opposite to the arrows B and C. The relation of the operation of the clutches 127, 128, 137 and 144 and the brakes 131, 136 and 145 to the transmission speeds is shown in the following table.

opens to the negative pressure chamber 18. The valve body 11c is urged by a spring 11d to close the passage 11b and is moved to open the passage 11b overcoming the force of the spring 11d when said solenoid 11a is energized. The first atmospheric pressure introducing solenoid valve 12 (the second atmospheric pressure introducing solenoid valve 13 has the same structure as the first atmospheric pressure introducing solenoid valve 12) comprises a valve body 12c for selectively opening and closing a passage 12b one end of which opens to the atmosphere and the other end of which opens to the negative pressure chamber 18. The valve body 12c is urged by a spring 12d to open the passage 12b and is moved to close the passage 12b overcoming the force of the spring 12d when said solenoid 12a is energized. Said controller 5 controls the solenoids 11a, 12a and 13a of the solenoid valves 11, 12 and 13 to control the negative pressure in the negative pressure chamber 18, thereby controlling the displacement of the diaphragm 17 to control the opening of the throttle valve 25.

When the acceleration switch 6 is turned on while the

TABLE

| SELECT VALVE | GEAR STAGE | FRONT CLUTCH 127 | REAR CLUTCH 128 | FRONT BRAKE 131 | REAR BRAKE 136 | ONE-WAY CLUTCH 137 | DIRECT DRIVE CLUTCH 144 | OVER-DRIVE BRAKE 145 |
|---|---|---|---|---|---|---|---|---|
| P |   |   |   |   |   |   | o |   |
| R |   | o |   |   | o |   | o |   |
| N |   |   |   |   |   |   | o |   |
| D | 1 |   | o |   |   | o | o |   |
|   | 2 |   | o | o |   |   | o |   |
|   | 3 | o | o |   |   |   | o |   |
|   | 4 | o | o |   |   |   |   | o |
| 2 |   |   | o | o |   |   | o |   |
| 1 | 1 |   | o |   | o |   | o |   |
|   | 2 |   | o | o |   |   | o |   |

As shown in FIG. 3, said actuator 10 is of a negative pressure diaphragm type and comprises a casing 16, the internal space of the casing being parted into a negative pressure chamber 18 and an atmospheric pressure chamber 20 by a diaphragm 17 formed of rubber. The negative pressure chamber 18 is isolated from the exterior in an airtight fashion, and the atmospheric pressure chamber 20 opens to the atmosphere by way of a communication hole 19. The diaphragm 17 is urged toward the atmospheric pressure chamber 20 by a spring 21 disposed in the negative pressure chamber 18. A negative pressure introducing solenoid valve 11 for controlling the negative pressure to be introduced into the negative pressure chamber 18 and first and second air introducing solenoid valves 12 and 13 (only one of which is seen in FIG. 3) for introducing the atmospheric air into the negative pressure chamber 18 are mounted on the negative pressure chamber side end face of the casing 16. A rod 22 connected to the diaphragm 17 extends through the atmospheric pressure chamber 20 and is supported for sliding movement by a bearing portion 23 provided on the casing 16. The rod 22 is connected to a throttle valve 25 in the intake passage of the engine by way of a wire 24 so that the throttle valve 25 is opened in response to a movement of the diaphragm 17 toward the negative pressure chamber 18 or in the direction of arrow A in FIG. 3.

The negative pressure introducing solenoid valve 11 comprises a valve body 11c for selectively opening and closing a passage 11b one end of which is connected to a negative pressure introducing pipe 26 leading to a negative pressure source and the other end of which vehicle is cruising at 40 to 100 Km/h, the vehicle speed at the moment the acceleration switch 6 is turned on represented by the signal from the vehicle speed sensor 9 is input into the controller 5 as the set speed, and thereafter, the controller 5 controls the actuator 10 to converge the actual vehicle speed to the set speed while comparing the actual vehicle speed with the set speed.

That is, when the actual vehicle speed becomes lower than the set speed, the controller 5 energizes the solenoid 11a of the negative pressure introducing solenoid valve 11 and the solenoid 12a of the first atmospheric pressure introducing solenoid valve 12 to open the former solenoid valve 11 and close the latter solenoid valve 12, whereby the diaphragm 17 is displaced in the direction of the arrow A under the force of the negative pressure introduced into the negative pressure chamber 18 and accordingly the throttle valve 25 is opened by way of the rod 22 and the wire 24 to increase the amount of fuel supply to the engine. Thus, the vehicle speed is increased to converge on the set speed. On the other hand, when the actual vehicle speed becomes higher than the set speed, the controller 5 de-energizes the solenoid 11a of the negative pressure introducing solenoid valve 11 and the solenoid 12a of the first atmospheric pressure introducing solenoid valve 12 to close the former solenoid valve 11 and open the latter solenoid valve 12, whereby the diaphragm 17 is displaced in the direction opposite to the arrow A and accordingly the throttle valve 25 is closed by way of the rod 22 and the wire 24 to decrease the amount of fuel supply to the engine. Thus, the vehicle speed is decreased to converge on the set speed. The solenoid 13a of the second atmospheric pressure introducing solenoid valve 13 is normally energized to close the valve 13 during the constant speed cruising. When at least one of the selector lever position switch 14 and the brake switch 15 is turned on, the solenoids 11a, 12a and 13a are all deenergized so that the negative pressure introducing solenoid valve 11 is closed and the first and second atmospheric pressure introducing solenoid valves 12 and 13 are opened. Thus, the negative pressure chamber 18 is opened to the atmosphere to make the actuator 10 inoperative and thereafter, the throttle valve 25 is driven by operation of the accelerator pedal.

Operation of the controller 5 will be described with reference to FIG. 4, hereinbelow.

In FIG. 4, the controller 5 starts the control from step S1, and then sets a control gain G at "K1" in step S2. As will be described in detail later, the control gain G determines the rate of change of the vehicle speed when the actual vehicle speed V is converged on a set speed Vs during constant speed cruising control, and the larger the control gain G is, the larger the rate of change of the vehicle speed is. Then, in step S3, constant speed cruising control is accomplished. As described above, in the constant speed cruising control, the actual vehicle speed is compared with the set speed, and the actuator 10 is controlled so that the throttle opening is increased when the former is lower than the latter and the throttle opening is reduced when the former is higher than the latter. In the next step S4, the actual vehicle speed V detected by the vehicle speed sensor 9 is input, and then in step S5, it is determined whether the difference between the actual vehicle speed V and the set speed Vs (=V−Vs) is larger than a predetermined value $\epsilon$ (e.g., 7Km/h). When the former is smaller than the latter, the controller 5 returns to the step S2 to repeat the steps S2 to S5, thereby continuing the normal constant speed cruising control.

When it is determined that the difference between the actual vehicle speed V and the set speed Vs is not smaller than the predetermined value $\epsilon$ in the step S5, that is, when the actual vehicle speed V is lowered by a predetermined amount from the set speed Vs, the transmission is shifted down by one speed to enhance the driving force in step S6. Further, in step S7, the control gain G is reduced to K2 which is smaller than K1. The control gain G of K2 is maintained until a predetermined time lapses after the downshift (step S8). When the difference between the actual vehicle speed V and the set speed Vs becomes smaller than another predetermined value $\epsilon'$, the transmission is shifted up to the original gear speed before the relevant downshift, and then the controller 5 returns to the step S2.

The control gain G is a value which determines the rate of convergance of the actual vehicle speed V on the set speed Vs. For example, the control gain G may determine the rate at which the throttle opening is controlled. That is, as shown in FIG. 5, in normal constant speed cruising control, the solenoid 11a of the negative pressure introducing solenoid valve 11 and the solenoid 12a of the first atmospheric pressure introducing solenoid valve 12 are repeatedly turned on and off to fix the actual vehicle speed V at the set speed Vs. When the actual vehicle speed V becomes lower than the set speed Vs, for example, as the vehicle ascends a slope, the solenoid 11a of the negative pressure introducing solenoid 11 is repeatedly turned on for a predetermined time interval T1 once a time interval 2T1 with the solenoid 12a of the first atmospheric pressure introducing solenoid valve 12 kept off, thereby increasing the throttle opening. And then, the actual vehicle speed V finally becomes lower than the set speed Vs by the predetermined amount $\epsilon$, the transmission is shifted down as described above, and at the same time the solenoid 11a of the negative pressure introducing solenoid valve 11 is turned off and the solenoid 12a of the first atmospheric pressure introducing solenoid valve 12 is turned on for a predetermined time interval to reduce the throttle opening by a predetermined amount. Thereafter, the solenoid 12a is kept closed and the solenoid 11a is repeatedly turned on for a predetermined time interval T2 once a time interval 2T1, the time interval T2 being shorter than T1 (half of T1 in this particular embodiment) so that the vehicle speed V is converged on the set speed Vs. At this time, since the time interval T2 for which the solenoid 11a is opened per unit time (2T1) after the downshift is shorter than the time interval T1 for which the solenoid 11a is opened for unit time (2T1) before the downshift, the throttle opening is slowly increased, whereby the actual vehicle speed V is gradually increased to the set speed Vs. The time interval T1 corresponds to the control gain G of K1 described above in conjunction with the flow chart shown in FIG. 4 and the time interval T2 corresponds to the control gain G of K2. Accordingly the control gain G is reduced to a half when the transmission is shifted down during constant speed cruising in this particular embodiment. The reason why the throttle opening is abruptly reduced upon the downshift is to synchronize the engine speed with the vehicle speed.

I claim:

1. A cruise control system for a vehicle having an automatic transmission comprising a vehicle speed detecting means for detecting the actual vehicle speed, an engine output power control means, a vehicle speed control means which compares the actual vehicle speed detected by the vehicle speed detecting means with a set speed and controls the engine output power control means in accordance with the result of the comparison so that the vehicle speed is converged upon the set speed at a predetermined rate, a downshift means which causes the automatic transmission to downshift when the actual vehicle speed is lowered from the set speed by a predetermined amount while the vehicle speed control means operates to fix the vehicle speed, and a rate reducing means which, when the automatic transmission is shifted down by the downshift means, controls the vehicle speed control means to reduce said predetermined rate to a reduced rate so that the vehicle speed is converged upon the set speed at said reduced rate.

2. A cruise control system as defined in claim 1 in which said predetermined rate is reduced for a predetermined time interval immediately after the automatic transmission is caused to downshift by the downshift means.

3. A cruise control system as defined in claim 2 in which said engine output power control means comprises a negative pressure diaphragm type actuator having a diaphragm driven in response to introduction and discharge of negative pressure into and from a negative pressure chamber and said predetermined rate is reduced by reducing the amount of negative pressure introduction per unit time which is controlled by the duty ratio of a duty signal delivered to a solenoid which communicates the negative pressure chamber to a negative pressure source when it is energized.

4. A cruise control system as defined in claim 1 in which said engine output power control means comprises a negative pressure diaphragm type actuator having a diaphragm driven in response to introduction and discharge of negative pressure into and from a negative pressure chamber.

5. A cruise control system as defined in claim 4 in which said predetermined rate is reduced by reducing the amount of negative pressure introduction per unit time.

6. A cruise control system as defined in claim 5 in which the amount of negative pressure introduction per unit time is controlled by the duty ratio of a duty signal delivered to a solenoid which communicates the negative pressure chamber to a negative pressure source when it is energized.

7. A cruise control system as defined in claim 1 in which said engine output power control means controls the engine output power by controlling the throttle opening, and reduces the throttle opening immediately after the automatic transmission is caused to downshift and increases the same reduced rate of convergence.

8. A cruise control system as defined in claim 7 in which said engine output power control means comprises a negative pressure diaphragm type actuator having a diaphragm driven in response to introduction and discharge of negative pressure into and from a negative pressure chamber and the throttle opening is reduced in response to discharge of negative pressure from the negative pressure chamber.

9. A cruise control system as defined in claim 1 in which said automatic transmission has overdrive as the highest gear speed, and the automatic transmission is caused to downshift by an overdrive releasing means.

10. A cruise control system as defined in claim 1 in which said engine output power control means controls the engine output power by controlling the throttle opening, and reduces the throttle opening immediately after the automatic transmission is caused to downshift and increases the same according to the reduced rate of convergence for a predetermined time interval immediately after the automatic transmission is caused to downshift by the downshift means.

* * * * *